United States Patent
Shi et al.

(10) Patent No.: US 8,291,743 B1
(45) Date of Patent: Oct. 23, 2012

(54) METHOD AND SYSTEM FOR CALIBRATING AN ELECTRONIC LAPPING GUIDE FOR A BEVELED POLE IN A MAGNETIC RECORDING TRANSDUCER

(75) Inventors: Changqing Shi, San Ramon, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 515 days.

(21) Appl. No.: 12/473,159

(22) Filed: May 27, 2009

(51) Int. Cl.
*G01N 37/00* (2006.01)
*G11B 27/36* (2006.01)

(52) U.S. Cl. .......................................... 73/1.01; 702/104

(58) Field of Classification Search .................. None
See application file for complete search history.

(56) References Cited

U.S. PATENT DOCUMENTS

| | | | |
|---|---|---|---|
| 4,157,497 A | 6/1979 | Eisen et al. | |
| 4,670,732 A | 6/1987 | Church | |
| 4,675,986 A | 6/1987 | Yen | |
| 5,065,483 A | 11/1991 | Zammit | |
| 5,210,667 A | 5/1993 | Zammit | |
| 5,361,547 A | 11/1994 | Church et al. | |
| 5,597,340 A | 1/1997 | Church et al. | |
| 5,678,086 A | 10/1997 | Gandola et al. | |
| 5,722,155 A | 3/1998 | Stover et al. | |
| 5,742,995 A | 4/1998 | Amin et al. | |
| 5,772,493 A | 6/1998 | Rottmayer et al. | |
| 5,876,264 A | 3/1999 | Church et al. | |
| 6,003,361 A | 12/1999 | Amin et al. | |
| 6,027,397 A | 2/2000 | Church et al. | |
| 6,047,224 A | 4/2000 | Stover et al. | |
| 6,083,081 A | 7/2000 | Fukuroi et al. | |
| 6,193,584 B1 | 2/2001 | Rudy et al. | |
| 6,288,870 B1 | 9/2001 | Saliba | |
| 6,347,983 B1 | 2/2002 | Hao et al. | |
| 6,364,743 B1 | 4/2002 | Pust et al. | |
| 6,399,401 B1 | 6/2002 | Kye et al. | |
| 6,475,064 B2 | 11/2002 | Hao et al. | |
| 6,532,646 B2 | 3/2003 | Watanuki | |

(Continued)

FOREIGN PATENT DOCUMENTS

JP  2000067408 A  3/2000

OTHER PUBLICATIONS

Matsushita, et al., "Elaborate Precision Machining Technologies for Creating High Added Value at Low Cost", Fujitsu Sci. Tech. J., 43, 1, pp. 67-75, Jan. 2007.

*Primary Examiner* — Daniel Larkin

(57) ABSTRACT

A method and system for calibrating an electronic lapping guide (ELG) for transducer(s) having an ABS and a magnetic structure are described. The magnetic structure has a desired thickness, a bevel, and a flare point a distance from the ABS. The method and system include providing at least three ELGs. A first ELG has first and second edges first and second distances from the ABS. A second ELG has third and fourth edges third and second distances from the ABS. A third ELG has fifth and sixth edges fourth and second distances from the ABS. The first, third, and fourth distances correspond to a stripe height and an offset. The first, third, and fourth distance and/or the second distance corresponds to an intersection between the bevel and the desired thickness. The method and system also include measuring resistances of the ELGs, and calibrating the ELG(s) utilizing the offset and resistances.

11 Claims, 6 Drawing Sheets

U.S. PATENT DOCUMENTS

| | | |
|---|---|---|
| 6,609,948 B1 | 8/2003 | Fontana, Jr. et al. |
| 6,623,330 B2 | 9/2003 | Fukuroi |
| 6,674,610 B1 | 1/2004 | Thomas et al. |
| 6,684,171 B2 | 1/2004 | Church et al. |
| 6,699,102 B2 | 3/2004 | Reiley et al. |
| 6,728,067 B2 | 4/2004 | Crawforth et al. |
| 6,758,722 B2 | 7/2004 | Zhu |
| 6,760,197 B2 | 7/2004 | Boutaghou et al. |
| 6,786,803 B2 | 9/2004 | Crawforth et al. |
| 6,793,557 B2 | 9/2004 | Bunch et al. |
| 6,846,222 B2 | 1/2005 | Church et al. |
| 6,857,937 B2 | 2/2005 | Bajorek |
| 6,884,148 B1 | 4/2005 | Dovek et al. |
| 6,935,923 B2 | 8/2005 | Burbank et al. |
| 6,950,289 B2 | 9/2005 | Lam et al. |
| 6,982,042 B2 | 1/2006 | Church et al. |
| 7,014,530 B2 | 3/2006 | Kasiraj et al. |
| 7,139,152 B2 | 11/2006 | Mahnad et al. |
| 7,149,061 B2 | 12/2006 | Yamakura et al. |
| 7,206,172 B2 | 4/2007 | Ding et al. |
| 7,244,169 B2 | 7/2007 | Cyrille et al. |
| 7,245,459 B2 | 7/2007 | Cyrille et al. |
| 7,268,976 B2 | 9/2007 | Yamakura et al. |
| 7,271,982 B2 | 9/2007 | MacDonald et al. |
| 7,272,883 B2 | 9/2007 | Le et al. |
| 7,287,316 B2 | 10/2007 | Kasahara et al. |
| 7,333,300 B2 | 2/2008 | Church et al. |
| 7,359,152 B2 | 4/2008 | Matono et al. |
| 7,360,296 B2 | 4/2008 | Cyrille et al. |
| 7,393,262 B2 | 7/2008 | Biskeborn |
| 7,422,511 B2 | 9/2008 | Fukuroi |
| 7,551,406 B1 | 6/2009 | Thomas et al. |
| 7,554,767 B1 | 6/2009 | Hu et al. |
| 7,564,110 B2 | 7/2009 | Beach et al. |
| 7,603,762 B2 | 10/2009 | Baer et al. |
| 7,643,250 B2 | 1/2010 | Araki et al. |
| 7,716,814 B2 | 5/2010 | Sasaki et al. |
| 7,770,281 B2 | 8/2010 | Pentek |
| 7,788,796 B2 | 9/2010 | Hsiao et al. |
| 7,861,400 B2 | 1/2011 | Lille |
| 8,151,441 B1 | 4/2012 | Rudy et al. |
| 8,165,709 B1 | 4/2012 | Rudy |
| 2001/0004800 A1 | 6/2001 | Yoshida et al. |
| 2001/0051491 A1 | 12/2001 | Hao et al. |
| 2002/0012204 A1 | 1/2002 | Boutaghou et al. |
| 2002/0173227 A1 | 11/2002 | Lam et al. |
| 2003/0020467 A1 | 1/2003 | Kasahara et al. |
| 2003/0021069 A1 | 1/2003 | Crawforth et al. |
| 2004/0009739 A1 | 1/2004 | Zhu |
| 2004/0075942 A1 | 4/2004 | Bajorek |
| 2004/0097173 A1 | 5/2004 | Crawforth et al. |
| 2004/0179310 A1 | 9/2004 | Lam et al. |
| 2005/0023673 A1 | 2/2005 | Nowak |
| 2005/0028354 A1 | 2/2005 | Shindo et al. |
| 2005/0070206 A1 | 3/2005 | Kasiraj et al. |
| 2005/0164607 A1 | 7/2005 | Bajorek |
| 2005/0180048 A1 | 8/2005 | MacDonald et al. |
| 2005/0185345 A1 | 8/2005 | Ding et al. |
| 2005/0219752 A1 | 10/2005 | Takahashi |
| 2006/0027528 A1 | 2/2006 | Church et al. |
| 2006/0028770 A1 | 2/2006 | Etoh et al. |
| 2006/0034021 A1 | 2/2006 | Wu |
| 2006/0044683 A1 | 3/2006 | Matono et al. |
| 2006/0103990 A1 | 5/2006 | Ito et al. |
| 2006/0126222 A1 | 6/2006 | Aoki et al. |
| 2006/0139802 A1 | 6/2006 | Sasaki et al. |
| 2006/0168798 A1 | 8/2006 | Naka |
| 2007/0008660 A1 | 1/2007 | Yamakura et al. |
| 2007/0070543 A1 | 3/2007 | Gunder et al. |
| 2007/0246761 A1 | 10/2007 | Beach et al. |
| 2008/0013219 A1 | 1/2008 | Wu |
| 2008/0072418 A1 | 3/2008 | Kondo et al. |
| 2008/0144215 A1 | 6/2008 | Hsiao et al. |
| 2008/0273275 A1 | 11/2008 | Lille |
| 2009/0152235 A1 | 6/2009 | Hsiao et al. |
| 2009/0211081 A1 | 8/2009 | Boone, Jr. et al. |
| 2009/0268348 A1 | 10/2009 | Bonhote et al. |
| 2010/0162556 A1 | 7/2010 | Guruz et al. |
| 2010/0165513 A1 | 7/2010 | Bonhote et al. |
| 2010/0208391 A1 | 8/2010 | Gokemeijer |

Side View

METHOD AND SYSTEM FOR CALIBRATING AN ELECTRONIC LAPPING GUIDE FOR A BEVELED POLE IN A MAGNETIC RECORDING TRANSDUCER

BACKGROUND

Conventional magnetic heads typically employ lapping to fabricate structures within the head. For example, lapping is typically used in processing a write transducer. More specifically, after pole formation, lapping may be used to remove a portion of the device to expose the air-bearing surface (ABS). Lapping determines the windage, the length measured from the ABS to the flare point of the pole of the write transducer. The windage, or nose length, is the distance from the ABS at which the angle the sides of the pole make with a plane parallel to the ABS increases. Similarly, lapping may be used in fabricating other structures in a head, such as the read sensor of a conventional read transducer.

In order to control lapping an electronic lapping guide (ELG) is typically used. FIG. 1 depicts a top view of a conventional ELG 10. The conventional ELG 10 is essentially a resistive stripe. Thus, the conventional ELG 10 is coupled with leads 14 and 16 that are used to determine the resistance of the conventional ELG 10. The conventional ELG has a length l from the surface 12 being lapped. As lapping continues, the surface 12 is worn away, and the length of the conventional ELG 10 decreases. As the length is reduced, the resistance of the conventional ELG 10 increases. Using the resistance of the conventional ELG 10, it can be determined when lapping should be terminated.

FIG. 2 is a flow chart depicting a conventional method 30 for performing lapping using the conventional ELG. The conventional method 30 is described in the context of the conventional ELG 10. The resistance of the conventional ELG 10 is measured during lapping of the transducer, via step 32. The current length of the conventional ELG 10 is determined based upon the resistance measured in step 32 and the sheet resistance of the conventional ELG 10, via step 34. The sheet resistance may be determined in a conventional manner using a conventional Van der Pauw pattern (not shown) provided on the substrate on which the magnetic transducer is to be fabricated. The conventional Van der Pauw test pattern is a well known pattern that may be used to determine sheet resistance of a stripe, such as the conventional ELG 10. Thus, after step 34, the length corresponding to a particular measured resistance for the conventional ELG 10 is known. Alternatively, step 34 could simply convert a desired windage to an ELG length and the ELG length to a desired target resistance of the conventional ELG 10.

The lapping is terminated when the resistance of the conventional ELG 10 indicates that the desired length or target resistance of the conventional ELG 10 has been reached, via step 36. Because the conventional ELG 10 and structure, such as a read sensor or pole, both exist on the transducer being lapped, the lengths of the conventional ELG 10 and the structure change with lapping. Consequently, the lengths of the read sensor or pole may also be set in step 36.

Although the conventional method 30 and conventional ELG 10 function, the desired windage or other desired length may not be easily determined for certain structures. For example, FIG. 3 depicts ABS, side, and top views of a conventional perpendicular magnetic recording (PMR) pole 40 that has a trailing edge bevel 42. For simplicity, FIG. 3 is not to scale. The conventional PMR pole 40 also has sidewalls 44 having a reverse angle and flare point 46. Stated differently, the conventional PMR pole 40 has a top wider than its bottom. Because of the combination of the bevel 42 and sidewalls 44, the windage, the track width, and the pole height change as part of the PMR pole 40 is lapped away. Thus, the geometry of the conventional PMR pole 40 make lapping to the desired windage (nl), track width (tw), and pole height (H) challenging. In addition, there are processing variations that occur for the separate processes used in determining the flare point 46, bevel 42, and sidewalls 44. Variations in these processes may cause variations in the shape or location of these features of the conventional PMR pole 40. It would be desirable, therefore, to compensate for these processing variations. Use of the conventional ELG 10 is not sufficient to do so.

Accordingly, what is needed is an improved method for providing and using an ELG in a magnetic transducer.

SUMMARY

A method and system for calibrating an electronic lapping guide (ELG) for least one transducer having an air-bearing surface (ABS) and a magnetic structure is described. The magnetic structure has a desired thickness, a bevel, and a flare point a distance from the ABS. The method and system include providing at least three ELGs. The first ELG has first and second edges first and second distances from the ABS. The first distance and/or the second distance correspond to an intersection between the bevel and the desired thickness. The second ELG has a third edge a third distance from the ABS and a fourth edge the second distance from the ABS. The third distance and/or the second distance correspond to the intersection between the bevel and the desired thickness. The third ELG has a fifth edge a fourth distance from the ABS and a sixth edge the second distance from the ABS. The first distance, the third distance, and the fourth distance correspond to a stripe height and an offset. The fourth distance and/or the second distance correspond to the intersection between the bevel and the desired thickness. The method and system also include measuring resistances of the first ELG, the second ELG, and the third ELG and calibrating the at least one ELG utilizing the offset and the resistances.

DETAILED DESCRIPTION OF THE PREFERRED EMBODIMENTS

Figure 1:
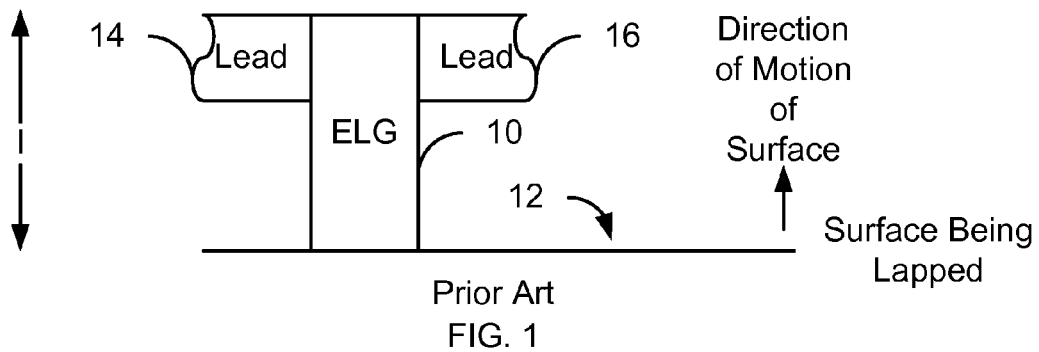
FIG. 1 depicts a conventional ELG as used in a conventional magnetic transducer.
Figure 2:
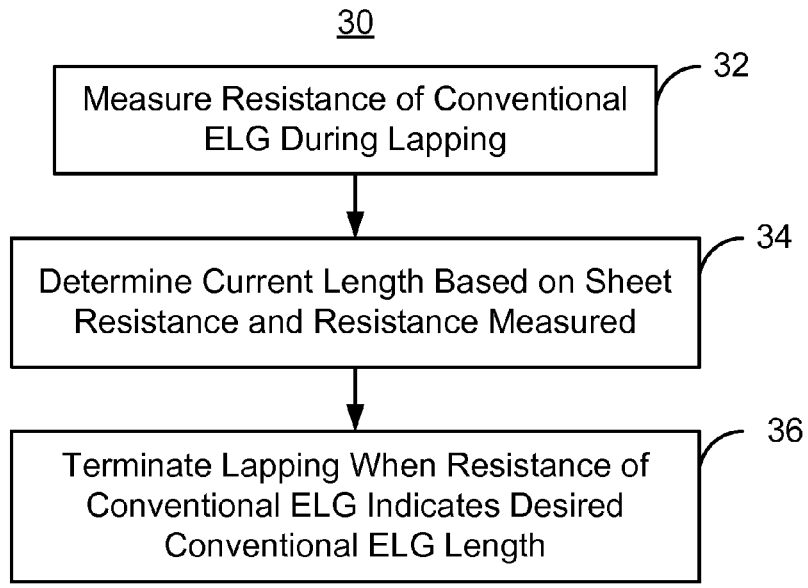
FIG. 2 is a flow chart depicting a conventional method for performing lapping utilizing a conventional ELG.
Figure 3:
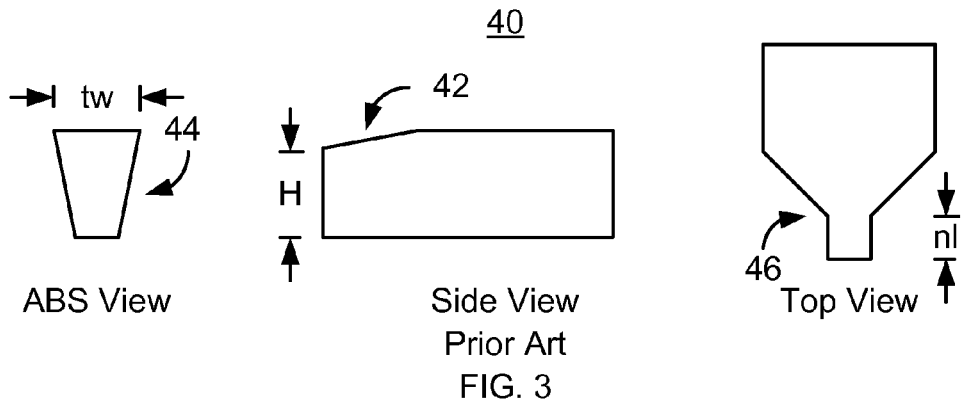
FIG. 3 depicts a conventional PMR pole in a conventional PMR transducer.
Figure 4:
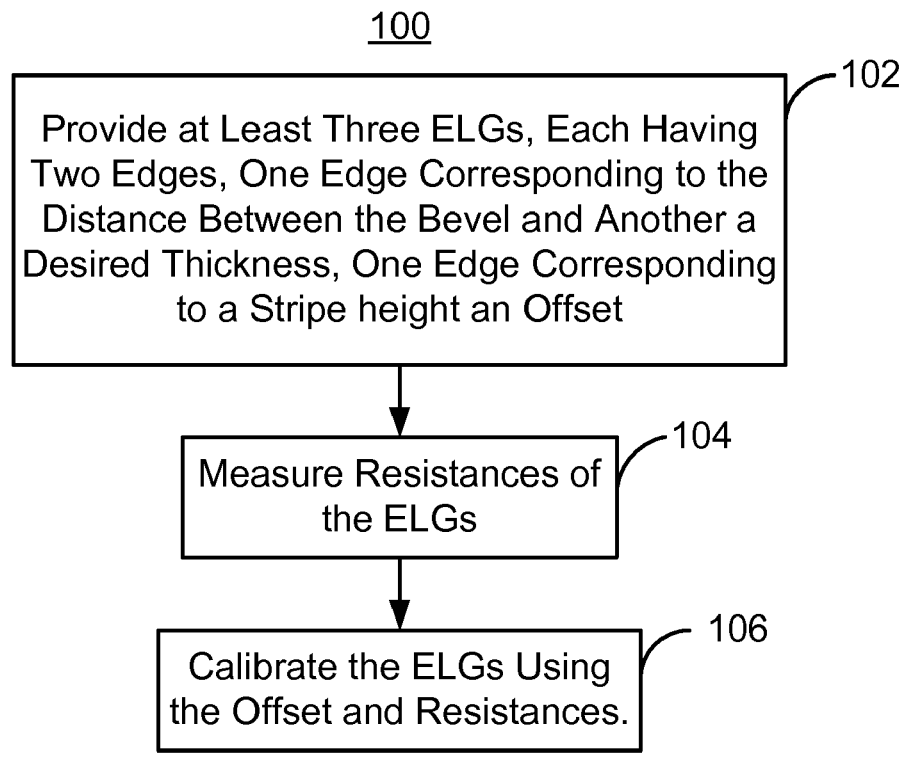
FIG. 4 is a flow chart depicting an exemplary embodiment of a method for calibrating ELGs.
Figure 5:
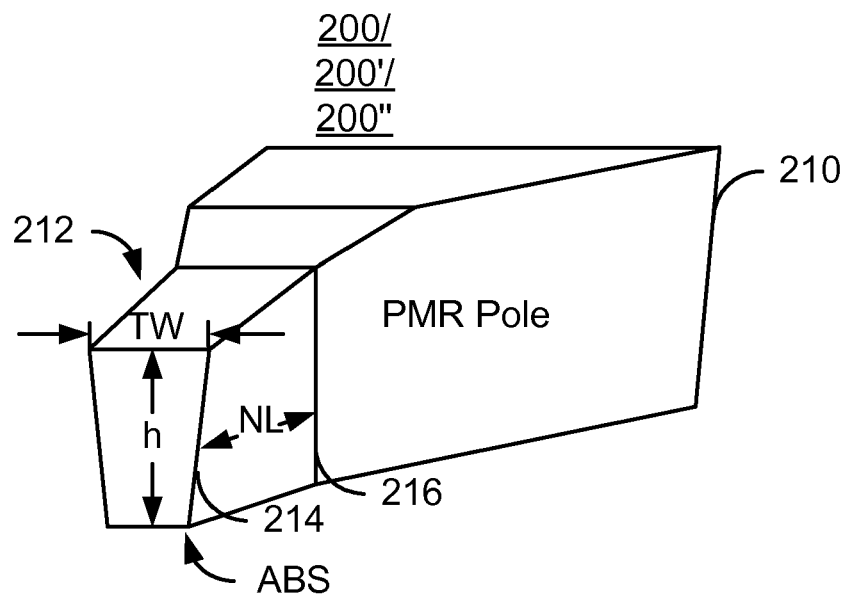
FIG. 5 depicts an exemplary embodiment of a transducer including a magnetic structure to be lapped using the ELGs.

FIG. 4 is a flow chart depicting an exemplary embodiment of a method 100 for calibrating ELGs. For simplicity, some steps of the method 100 may be omitted. FIGS. 5-8 depict exemplary embodiments of a portion of transducers 200, 200', and 200" with which the method 100 may be used. For clarity FIGS. 5-8 are not to scale. The transducers 200, 200', and 200" each includes at least one magnetic structure 210 on which lapping is to be performed. The magnetic structure being fabricated is shown in FIG. 5. Thus, the transducer in FIG. 5 is labeled 200/200'/200". In the embodiment shown, the magnetic structure 210 is a PMR pole having a desired thickness, h, a bevel 212, and a flare point 216 a distance (NL) from the ABS. The PMR pole 210 also includes sidewalls 214 having a reverse angle and is characterized by track width TW. The transducers 200, 200', and 200" may be part of a merged head including a read transducer and the write transducer. The transducers 200, 200', and 200" may thus be fabricated on wafer(s) which hold numerous transducers (not shown). Once fabrication is complete, or at some other point in processing, the transducers 200, 200', and 200" may be separated from the wafer(s) on which they were fabricated and incorporated into a hard disk drive. The transducers 200, 200', and 200" may each reside on a slider (not shown). Although depicted in FIG. 5 as PMR pole 210, a magnetic structure may include any structure formed in a magnetic transducer. In various embodiments, other numbers of ELGs per transducer and/or per magnetic structure, including greater or less than three per transducer/magnetic structure, may be used. Further, the method 100 and transducers 200, 200', and 200" are described in the context of a flare point 216 and bevel 212. The flare point corresponds to a point of interest from which distance to the desired ABS/surface, such as a windage, is measured. Consequently, in some embodiments, the magnetic structure fabricated using the method 100 may include some other feature corresponding to the flare point. Similarly, the bevel corresponds to a surface, top or bottom, of the magnetic structure 210 which is not perpendicular to the ABS or which otherwise defines a location of interest on the magnetic structure. The method 100 is also described in the context of single transducers 200, 200', and 200". However, the method 100 may be used for fabricating multiple transducers and/or multiple structures and may employ multiple ELG(s) at substantially the same time. The magnetic structure 210 being fabricated has may be desired to adjoin the ABS. Thus, in the embodiment shown, the lapping to be performed based on calibration using the method 100 proceeds to the ABS location (the location at which the ABS is formed). However, in another embodiment, the lapping may be used to expose another surface.

At least three ELGs having the desired offsets and stripe heights are provided, via step 102. Thus, at least a first ELG, a second ELG, and a third ELG are formed. Step 102 may include depositing a resistive sheet and fabricating the three or more ELGs from the resistive sheet. The ELGs are configured so that one of their edges correspond to a particular position, such as the intersection between the bevel 212 and the desired thickness h. Such a position may correspond to the desired location of the ABS. However, another location such as the flare point may also be selected. The ELGs are also configured in step 102 such that another edge corresponds to the desired stripe height and an offset. For three ELGs, the other edges may correspond to the stripe height, the stripe height plus an offset, and the stripe height minus an offset. Stated differently, the locations of the other edges of the three or more ELGs may be expressed in terms of two variables (e.g. the stripe height and an offset). The ELGs may be fabricated by using a single mask and shifting the reticle a known amount between the different ELGs. Shirting the reticle may provide the most reliable determination of the offsets. Portions of the ELGs may be removed to the same location, such as the intersection of bevel and the desired height. However, in another embodiment, another method for providing the offsets may be used.

Figure 6:
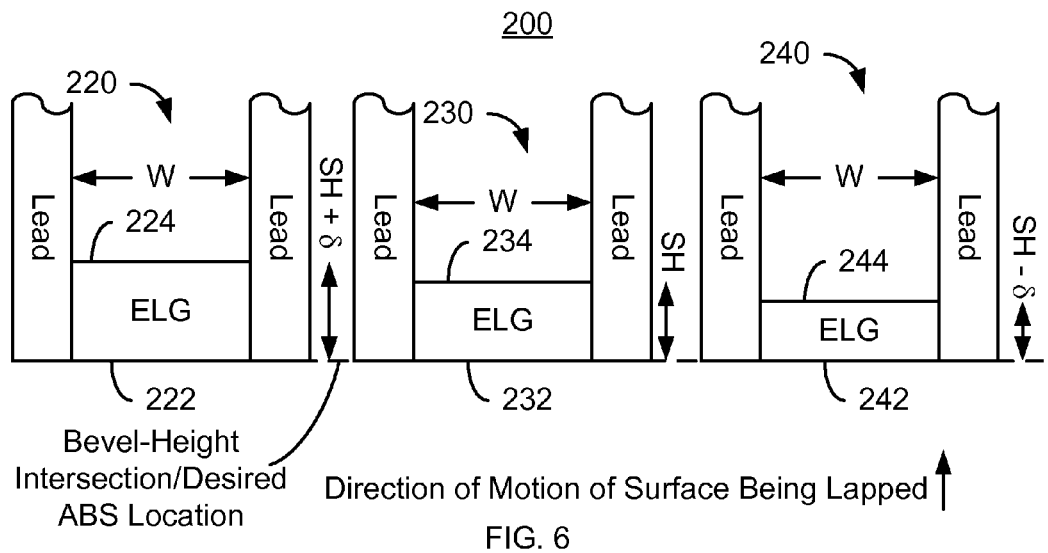
FIG. 6 depicts another exemplary embodiment of a transducer including the ELGs.

FIG. 6 depicts one embodiment of a transducer 200 after step 102 is performed. Thus, three ELGs 220, 230, and 240 are shown. The ELGs 220, 230, and 240 have edges 222, 232, and 242, respectively, at a location defined by the intersection of the bevel and the desired height. The other edges 224, 234, and 244 are located at the stripe height plus an offset (SH+δ), the stripe height (SH) and the stripe height minus an offset (SH−δ) from the bevel location. Thus, each of the ELGs 220, 230, and 240 has a common location and lengths that differ in known ways.

Figure 7:
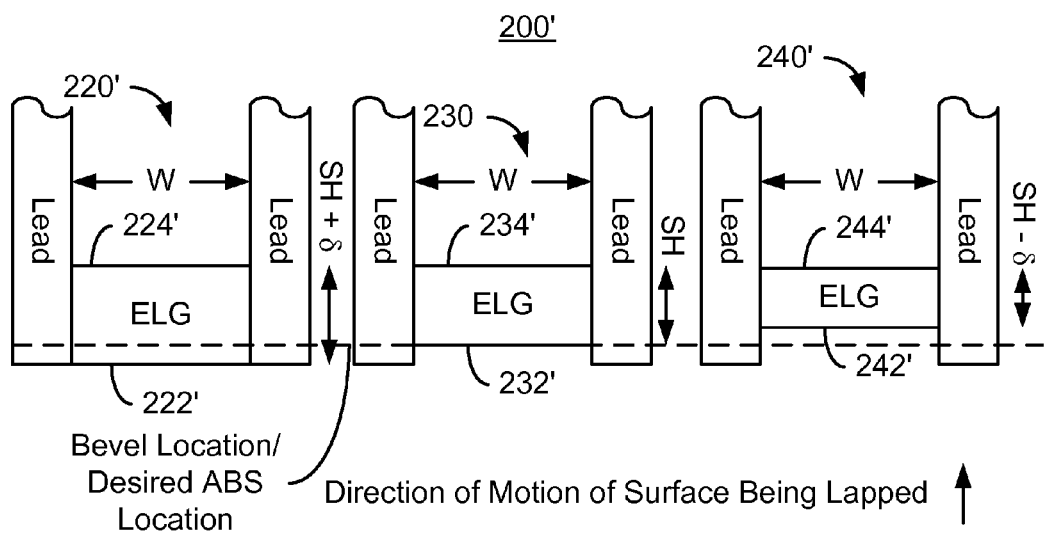
FIG. 7 depicts another exemplary embodiment of a transducer including the ELGs.

FIG. 7 depicts another embodiment of a transducer 200' after step 102 is performed. Thus, three ELGs 220', 230', and 240' are shown. The ELGs 220', 230', and 240' have edges 224', 234', and 244', respectively, at a known location. In the embodiment shown, the edges 224', 234', and 244' may be at the flare point. The other edges 224', 234', and 244' are located at the stripe height plus an offset (SH+δ), the stripe height (SH) and the stripe height minus an offset (SH−δ) from the flare point. Thus, each of the ELGs 220', 230', and 240' has a common location and lengths that differ in known ways.

Figure 8:
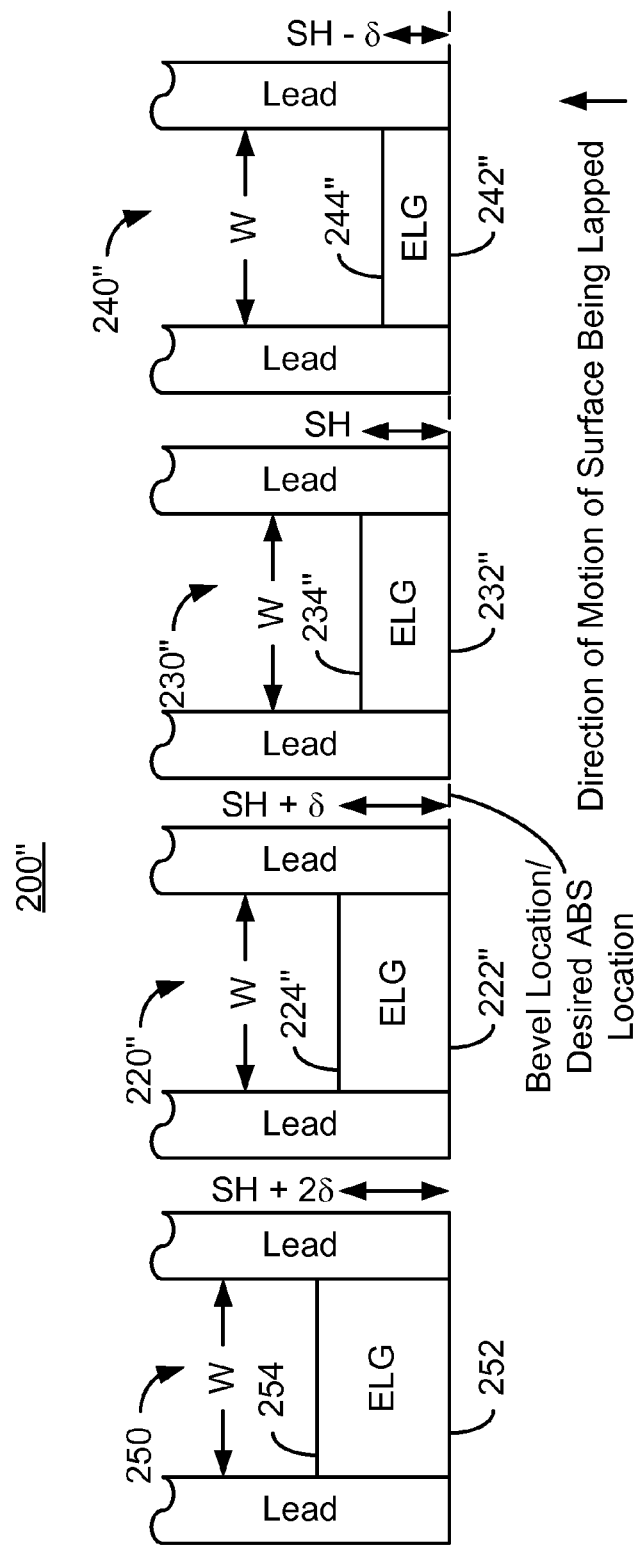
FIG. 8 depicts another exemplary embodiment of a transducer including the ELGs.

FIG. 8 depicts another embodiment of a transducer 200" after step 102 is performed. In this embodiment, four ELGs 220", 230", 240", and 250 are shown. The ELGs 220", 230", 240", and 250 have edges 222", 232", 242", and 252 respectively, at a known location. In the embodiment shown, the edges 222", 232", 242", and 252 may be at the intersection between the bevel 212 and the desired height h (i.e. at the desired ABS). The other edges 224", 234", 244", and 254 are located at the stripe height plus an offset (SH+δ), the stripe height (SH) the stripe height minus an offset (SH−δ), and the stripe height plus twice the offset (SH+2δ) from the bevel 212-height intersection. The offset, d, may vary. In some embodiments, δ may be at least fifty nanometers and not more than one hundred nanometers. However, the offset δ may vary based on the structure 210 being fabricated and is generally desired to be in the process window range. Thus, each of the ELGs 220", 230", 240", and 250 has a common location and lengths that differ in known ways.

The resistances of the ELGs are measured, via step 104. Thus, for the transducer 200, the resistances of the ELGs 220, 230, and 240 are determined. For the transducer 200', the resistances of the ELGs 220', 230', and 240' are determined. For the transducer 200", the resistances of the ELGs 220", 230", 240", and 250 are determined.

The ELGs are calibrated using the offset and the resistances, via step 106. Step 106 may include determining the stripe height, a target resistance of each ELG, and a sheet resistance of the ELGs. The calibration may be determined using a linear model for the resistances. For example, for the transducer 200, the resistances of the ELGs 220, 230, and 240 are given by: $R_{220}=R_L+R_S*\{W/(SH+\delta)\}$; $R_{230}=R_L+R_S*\{W/(SH)\}$; and $R_{240}=R_L+R_S*\{W/(SH-\delta)\}$. These equations may be solved for the desired stripe height (SH), $R_S*W$, and $R_L$. In particular, $SH=\delta*(R_{240}-R_{220})/(R_{240}+R_{220}-2*R_{230})$, $R_S*W=2*\delta*(R_{240}-R_{220})*(R_{240}-R_{230})*(R_{230}-R_{220})/[R_{220}+R_{240}-2*R_{230}]^2$; and $R_L=[2*R_{220}*R_{240}-R_{240}*R_{230}-R_{230}*R_{220}]/(R_{240}+R_{220}-2*R_{230})$. Consequently, the stripe height and thus the windage can be determined. If more than three ELGs are used, then higher order terms or other variables might be taken into account. Thus, the stripe height and the resistance coefficient, or resistance per unit length, may be determined.

Using the method 100, the ELGs 220, 230, and 240; the ELGs 220', 230', and 240', and the ELGs 220", 230", 240", and 250 may be calibrated. For example, the resistance per unit length of the ELGs may be determined based on the resistances, stripe height, and offset. In one embodiment, the stripe heights, SH, correspond to the desired windage because the back edge 234 of the non-offset ELG 230 is desired to be aligned with the flare point 216 of the PMR pole 210. In addition to the stripe height, the actual windage may be calculated using the resistance per unit length and measured resistance of the ELGs during lapping. Because the actual windage may be determined, variations in processing and other inconsistencies may be taken into account. In particular, the actual windage values may be used in lapping the PMR pole 210 or other analogous structure. Consequently, better control of lapping and thus better control over the final structure may be achieved. Improvements in manufacturing and performance of the transducers 200/200'/200" may thus be accomplished.

Figure 9:
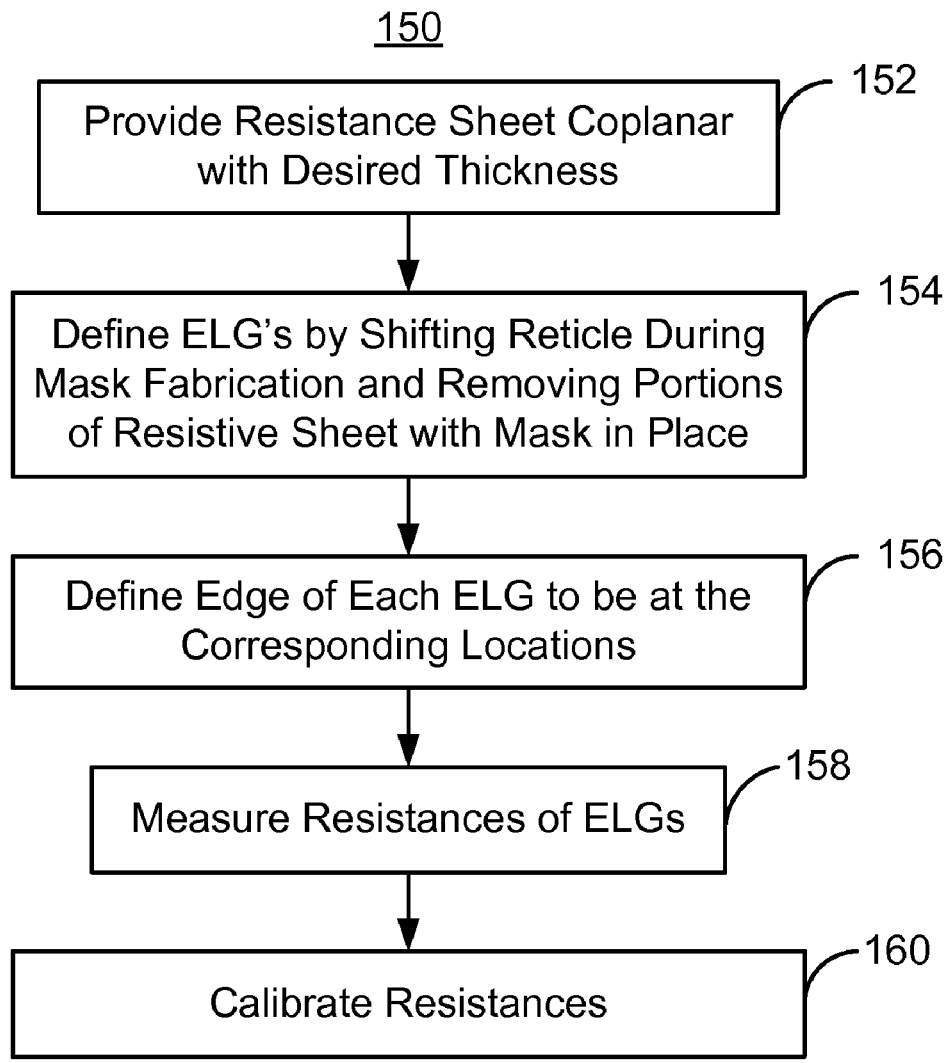
FIG. 9 is a flow chart depicting an exemplary embodiment of a method for calibrating ELGs.
Figure 10:
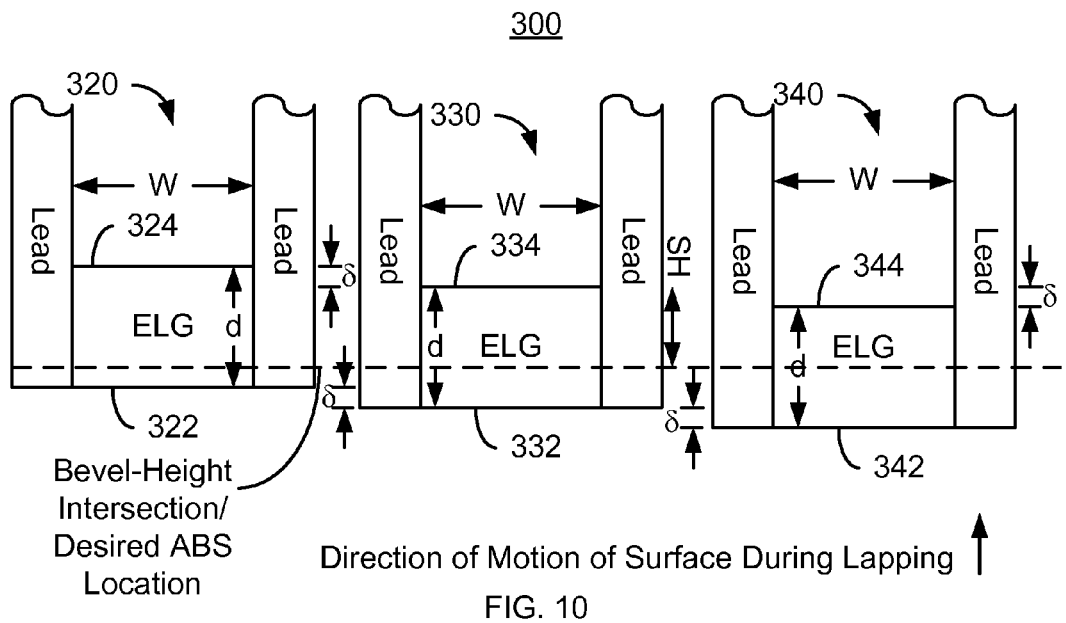
FIGS. 10-11 depict another exemplary embodiment of a transducer including the ELGs during fabrication of the ELGs.
Figure 11:
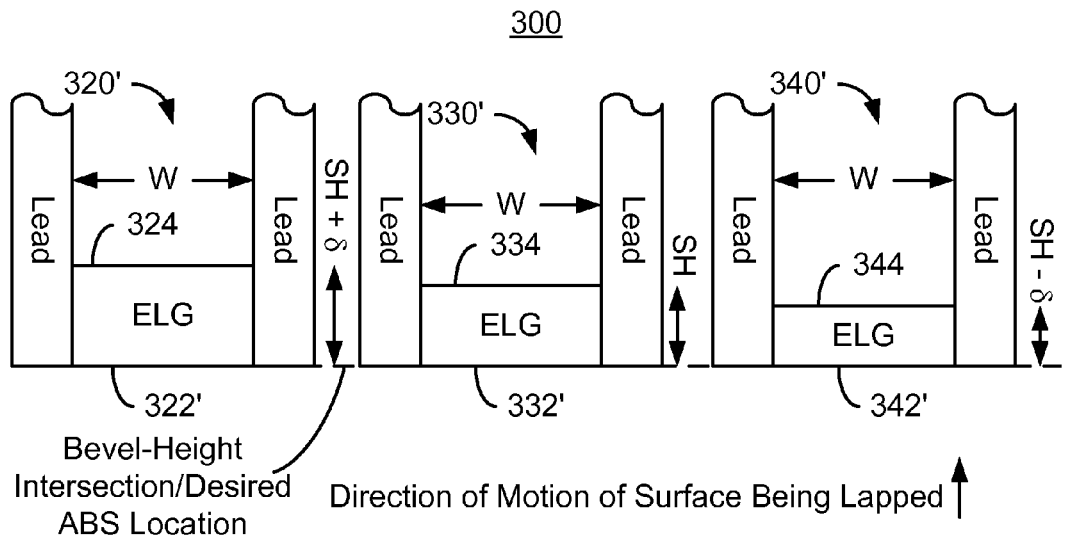

FIG. 9 is a flow chart depicting another exemplary embodiment of a method 150 for calibrating ELGs. For simplicity, some steps of the method 150 may be omitted. FIGS. 10-11 depict another exemplary embodiment of a transducer 300 including the ELGs 320, 330, and 340 during fabrication of the ELGs. For clarity, FIGS. 10-11 are not to scale. The transducer 300 includes a magnetic structure such as the PMR pole 210 depicted in FIG. 5 and for fabrication of which the ELGs are desired to be calibrated. In the embodiment shown, the magnetic structure 210 is a PMR pole having a desired thickness, h, a bevel 212, and a flare point 216 a distance (NL) from the ABS. The PMR pole 210 also includes sidewalls 214 having a reverse angle and is characterized by a track width TW. Note that FIG. 5 depicts the PMR pole 210 after lapping to the ABS. The transducer 300 is analogous to the transducer 200. The transducer 300 may thus be fabricated on wafer(s) which hold numerous transducers (not shown). Once fabrication is complete, or at some other point in processing, the transducers may be separated from the wafer(s) on which they were fabricated and incorporated into a hard disk drive. The transducer 300 may reside on a slider (not shown). Although depicted in FIG. 5 as a PMR pole 210, a magnetic structure may include any structure formed in a magnetic transducer. In various embodiments, other numbers of ELGs per transducer and/or per magnetic structure, including greater or less than three per transducer/magnetic structure, may be used. Further, the method 100 and transducers 200, 200', and 200" are described in the context of a flare point 216 and bevel 212. The flare point corresponds to a point of interest from which distance to the desired ABS, such as a windage, is measured. Consequently, in some embodiments, the magnetic structure fabricated using the method 150 may include some other feature corresponding to the flare point. Similarly, the bevel corresponds to a surface, top or bottom, of the magnetic structure 210 which is not perpendicular to the ABS or which otherwise defines a location of interest on the magnetic structure. The method 150 is also described in the context of single transducer 300. However, the method 150 may be used for fabricating multiple transducers and/or multiple structures and may employ multiple ELG(s) at substantially the same time. The magnetic structure 210 being fabricated has may be desired to adjoin the ABS. Thus, in the embodiment shown, the lapping to be performed based on calibration using the method 150 proceeds to the ABS location (the location at which the ABS is formed). However, in another embodiment, the lapping may be used to expose another surface.

A resistive sheet substantially coplanar with the desired thickness, h, of the PMR pole is provided, via step 152. The ELG's are defined from the resistive sheet such that at least one of their edges are offset by known amounts, via step 154. In one embodiment, step 154 is performed by shifting the reticle for each of the ELGs during mask formation, then using the mask formed by the shifted reticle to remove portions of the resistive sheet. FIG. 10 depicts the transducer 300 after step 154 has been performed. Thus, ELGs 320, 330, and 340 are shown. However, in another embodiment, another number of ELGs may be fabricated. Each ELG has the same depth, d. However, the front edges 322, 332 and 342 as well as the back edges 324, 334, and 344 are offset due to the shift in the reticle. For example, the reticle would be at one location when the mask for the ELG 320 is formed, shifted by an amount corresponding to δ when the mask for the ELG 330 is formed, and shifted again by an amount corresponding to δ when the mask for the ELG 340 is formed.

One set of the edges is then set along a line, via step 156. In one embodiment, portions of the ELGs 320, 330, and 340 near the front edges 322, 332, and 342, respectively, are removed. In another embodiment, portions of the ELGs 320, 330, and 340 near the back edges 324, 334, and 344, respectively, are removed. FIG. 11 depicts the transducer 300 after step 158 is performed. In the embodiment shown, the front edges 322', 332', and 342' have been set along the same line. In one embodiment, this is accomplished by exposing the ELGs 320, 330, and 340 in the same manner as the PMR pole 210 during formation of the bevel 212. Thus, the same processing step, such as an ion mill, that forms the bevel also forms the front edges 322', 332', and 342'. Thus, the front edges 322', 332', and 342' are at locations corresponding to the intersection of the bevel 212 and the desired height, h, of the PMR pole. Further, the depth of the ELG 320' is now SH+δ, the depth of the ELG 330' is SH, and the depth of the ELG 340' is SH−δ. In other embodiments, the offsets between the ELGs 320', 330', and 340' may differ as long the relationships between the offsets are known. Thus, using steps 154 and 156, the ELGs 320', 330', and 340' are formed.

The resistances of the ELGs 320', 330', and 340' are measured, via step 158. The ELGs 320', 330', and 340' are then calibrated using the offset, δ, and the resistances measured, via step 160. In one embodiment, the linear model described above may be used in calibrating the ELGs 320', 330', and 340'. Thus, the stripe height, SH and offset d, may be calculated. Consequently, the windage (distance between the ABS and flare point 216) of the PMR pole 210 may be determined.

Using the method 150, the ELGs 320', 330', and 340' may be calibrated. More specifically, quantities such as the stripe height and resistance per unit length may be calculated. The lengths of the ELGs 320', 330', and 340' during lapping may be determined based on the resistances. The final lengths of the ELGs 320', 330', and 340' after lapping and thus the actual windage of the PMR pole 210 may also be determined. Because the actual windage may be determined, variations in processing and other inconsistencies may be taken into account. In particular, the actual windage values may be used in lapping the PMR pole 210 or other analogous structure. Consequently, better control of lapping and thus better control over the final structure may be achieved. Improvements in manufacturing and performance of the transducers 200/200'/200" may thus be accomplished.

We claim:

1. A method for calibrating an electronic lapping guide (ELG) for least one transducer having an air-bearing surface (ABS) and a magnetic structure, the magnetic structure having a desired thickness, a bevel, and a flare point a distance from the ABS, the method further comprising:

providing at least a first ELG, a second ELG, and a third ELG, the first ELG having a first edge a first distance from the ABS and a second edge a second distance from the ABS, at least one of the first distance and the second distance corresponding to an intersection between the bevel and the desired thickness, the second ELG having a third edge a third distance from the ABS and a fourth edge the second distance from the ABS, at least one of the third distance and the second distance corresponding to the intersection between the bevel and the desired thickness, the third ELG having a fifth edge a fourth distance from the ABS and a sixth edge the second distance from the ABS, the first distance, the third distance, and the fourth distance corresponding to a stripe height and an offset, at least one of the fourth distance and the second distance corresponding to the intersection between the bevel and the desired thickness;

measuring resistances of the first ELG, the second ELG, and the third ELG; and calibrating the at least one of the first ELG, the second ELG, and the third ELG utilizing the offset and the resistances.

2. The method of claim 1 wherein the magnetic structure is a pole having the bevel and a plurality of sides, the plurality of sides having a reverse angle.

3. The method of claim 1 further wherein the step of calibrating further includes:

determining the stripe height, a target resistance, and a sheet resistance of the at least one of the first ELG, the second ELG and the third ELG.

4. The method of claim 3 wherein the step of providing the at least the first ELG, the second ELG, and a third ELG utilizes a reticle to provide a mask and wherein the step of providing the at least the first ELG, the second ELG, and a third ELG further includes:

shifting the reticle between the first ELG, the second ELG, and the third ELG to provide the offset between the first ELG, the second ELG, and the third ELG in the mask.

5. The method of claim 1 wherein the second distance corresponds to an intersection between the bevel and the desired thickness.

6. The method of claim 1 wherein the first distance, the third distance, and the fourth distance each corresponds to an intersection between the bevel and the desired thickness.

7. The method of claim 1 wherein the first distance is the third distance minus the offset and the fourth distance is the third distance plus the offset.

8. The method of claim 1 wherein the step of providing the at least the first ELG, the second ELG and the third ELG further includes:

providing a fourth ELG having a seventh edge a fifth distance from the ABS and an eighth edge a second distance from the ABS, at least one of the seventh distance and the second distance corresponding to an intersection between the bevel and the desired thickness.

9. The method of claim 8 wherein the step of measuring the resistances further includes:

measuring resistance of the fourth ELG.

10. The method of claim 9 wherein the step of calibrating the at least one ELG further includes calibrating the at least one ELG utilizing the resistance.

11. A method for calibrating an electronic lapping guide (ELG) for least one transducer having an air-bearing surface (ABS) and a pole, the pole having a desired thickness, a bevel, and a flare point a distance from the ABS, the method further comprising:

providing a resistive sheet substantially coplanar with the desired thickness;

providing at least a first ELG, a second ELG, and a third ELG from the resistive sheet, the first ELG having a first edge a first distance from the ABS and a second edge a second distance from the ABS, at least one of the first distance and the second distance corresponding to an intersection between the bevel and the desired thickness, the second ELG having a third edge a third distance from the ABS and a fourth edge the second distance from the ABS, at least one of the third distance and the second distance corresponding to the intersection between the bevel and the desired thickness, the third ELG having a fifth edge a fourth distance from the ABS and a sixth edge the second distance from the ABS, the first distance, the third distance, and the fourth distance corresponding to a stripe height and an offset, at least one of the fifth distance and the second distance corresponding to the intersection between the bevel and the desired thickness, the first distance being the third distance plus the offset, the fourth distance being the third distance minus the offset, the step of providing the at least the first ELG, the second ELG, and a third ELG utilizing a reticle to provide a mask, the reticle being shifted between the first ELG, the second ELG, and the third ELG to provide the offset between the first ELG, the second ELG, and the third ELG in the mask;

measuring resistances of the first ELG, the second ELG, and the third ELG; and calibrating the at least one of the ELG, the second ELG and the third ELG utilizing the offset and the resistances.

* * * * *